US006665524B1

(12) United States Patent
Niemann

(10) Patent No.: US 6,665,524 B1
(45) Date of Patent: Dec. 16, 2003

(54) CELLULAR TELEPHONE HOLDER

(76) Inventor: Pieter J. J. Niemann, P.O. Box 1949 Rooihuiskraal, Centurion, Pretoria 154 (ZA)

( * ) Notice: Subject to any disclaimer, the term of this patent is extended or adjusted under 35 U.S.C. 154(b) by 518 days.

(21) Appl. No.: 09/684,479

(22) Filed: Oct. 6, 2000

(51) Int. Cl.[7] .................................................. H04B 1/38
(52) U.S. Cl. ..................................... 455/90; 248/309.1
(58) Field of Search ................................. 379/455, 446, 379/426, 454; 248/176.1, 309.1, 316.1, 316.4, 316.6, 317.7, 229.1, 229.12, 229.16, 229.22, 229.26, 231.81; 455/90, 550.1, 575.1, 575.4; D14/138, 140, 251, 253

(56) References Cited

U.S. PATENT DOCUMENTS

| 5,033,709 A | 7/1991 | Yuen |
|---|---|---|
| 5,253,292 A | 10/1993 | Fluder et al. |
| 5,457,745 A | 10/1995 | Wang |
| D368,582 S | 4/1996 | King et al. |
| 5,511,704 A | 4/1996 | Linderer |
| 5,711,469 A | 1/1998 | Gormley et al. |
| 6,073,318 A * | 6/2000 | Phillips ........................ 24/499 |
| 6,229,893 B1 * | 5/2001 | Chen ........................... 379/454 |

* cited by examiner

Primary Examiner—Nay Maung
Assistant Examiner—Tu X Nguyen

(57) ABSTRACT

A cellular telephone holder for securely holding a cell phone to one's person while running or walking. The cellular telephone holder includes a first clamp member being adapted to support a bottom end of a cellular telephone; and also includes a second clamp member being adapted to support an upper end of the cellular telephone; and further includes a locking member for joining the first clamp member to the second clamp member; and also includes a fastener assembly for fastening the cellular telephone holder to clothing of user.

14 Claims, 2 Drawing Sheets

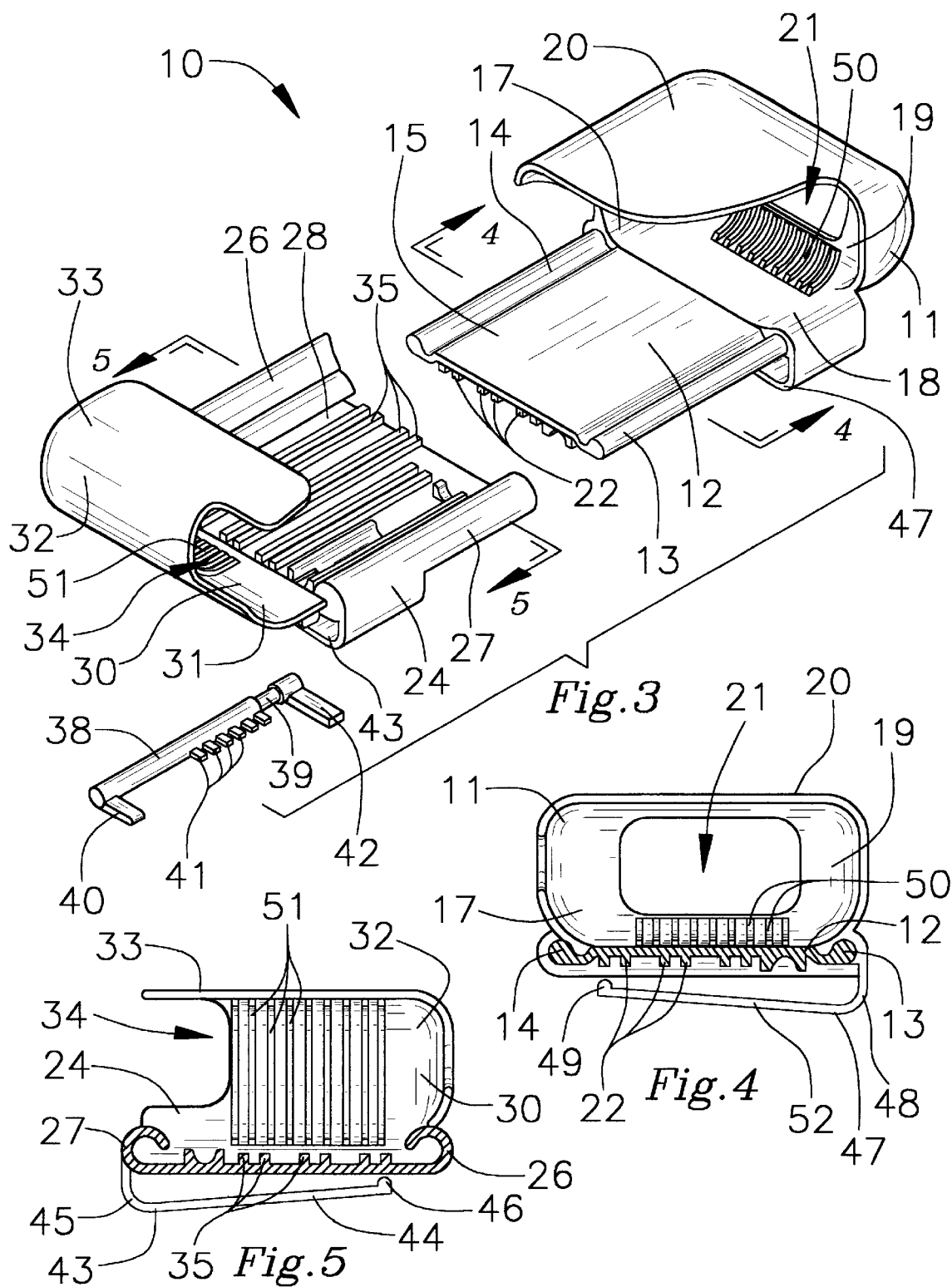

CELLULAR TELEPHONE HOLDER

BACKGROUND OF THE INVENTION

1. Field of the Invention

The present invention relates to a holder for a cell phone and more particularly pertains to a new cellular telephone holder for securely holding a cell phone to one's person while running or walking.

2. Description of the Prior Art

The use of a holder for a cell phone is known in the prior art. More specifically, a holder for a cell phone heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,457,745; U.S. Pat. No. 5,511,704; U.S. Pat. No. 5,711,469; U.S. Pat. No. 5,033,709; U.S. Pat. No. 5,253,292; and U.S. Pat. No. Des. 368,582.

While these devices fulfill their respective, particular objectives and requirements, the aforementioned patents do not disclose a new cellular telephone holder. The inventive device includes a first clamp member being adapted to support a bottom end of a cellular telephone; and also includes a second clamp member being adapted to support an upper end of the cellular telephone; and further includes a locking member for joining the first clamp member to the second clamp member; and also includes a fastener assembly for fastening the cellular telephone holder to clothing of user.

In these respects, the cellular telephone holder according to the present invention substantially departs from the conventional concepts and designs of the prior art, and in so doing provides an apparatus primarily developed for the purpose of for securely holding a cell phone to one's person while running or walking.

SUMMARY OF THE INVENTION

In view of the foregoing disadvantages inherent in the known types of holder for a cell phone now present in the prior art, the present invention provides a new cellular telephone holder construction wherein the same can be utilized for securely holding a cell phone to one's person while running or walking.

The general purpose of the present invention, which will be described subsequently in greater detail, is to provide a new cellular telephone holder which has many of the advantages of the holder for a cell phone mentioned heretofore and many novel features that result in a new cellular telephone holder which is not anticipated, rendered obvious, suggested, or even implied by any of the prior art holder for a cell phone, either alone or in any combination thereof.

To attain this, the present invention generally comprises a first clamp member being adapted to support a bottom end of a cellular telephone; and also includes a second clamp member being adapted to support an upper end of the cellular telephone; and further includes a locking member for joining the first clamp member to the second clamp member; and also includes a fastener assembly for fastening the cellular telephone holder to clothing of user.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new cellular telephone holder which has many of the advantages of the holder for a cell phone mentioned heretofore and many novel features that result in a new cellular telephone holder which is not anticipated, rendered obvious, suggested, or even implied by any of the prior art holder for a cell phone, either alone or in any combination thereof.

It is another object of the present invention to provide a new cellular telephone holder which may be easily and efficiently manufactured and marketed.

It is a further object of the present invention to provide a new cellular telephone holder which is of a durable and reliable construction.

An even further object of the present invention is to provide a new cellular telephone holder which is susceptible of a low cost of manufacture with regard to both materials and labor, and which accordingly is then susceptible of low prices of sale to the consuming public, thereby making such cellular telephone holder economically available to the buying public.

Still yet another object of the present invention is to provide a new cellular telephone holder which provides in the apparatuses and methods of the prior art some of the advantages thereof, while simultaneously overcoming some of the disadvantages normally associated therewith.

Still another object of the present invention is to provide a new cellular telephone holder for for securely holding a cell phone to one's person while running or walking.

Yet another object of the present invention is to provide a new cellular telephone holder which includes a first clamp member being adapted to support a bottom end of a cellular telephone; and also includes a second clamp member being adapted to support an upper end of the cellular telephone;

and further includes a locking member for joining the first clamp member to the second clamp member; and also includes a fastener assembly for fastening the cellular telephone holder to clothing of user.

Still yet another object of the present invention is to provide a new cellular telephone holder that allows the user to quickly attach and detach the cellular telephone holder about a cell phone.

Even still another object of the present invention is to provide a new cellular telephone holder that is easy and convenient to use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an exploded perspective view of the present invention.

FIG. 4 is a lateral cross-sectional view of the present invention.

FIG. 5 is another lateral cross-sectional view of the present invention.

DESCRIPTION OF THE PREFERRED EMBODIMENT

Figure 1:
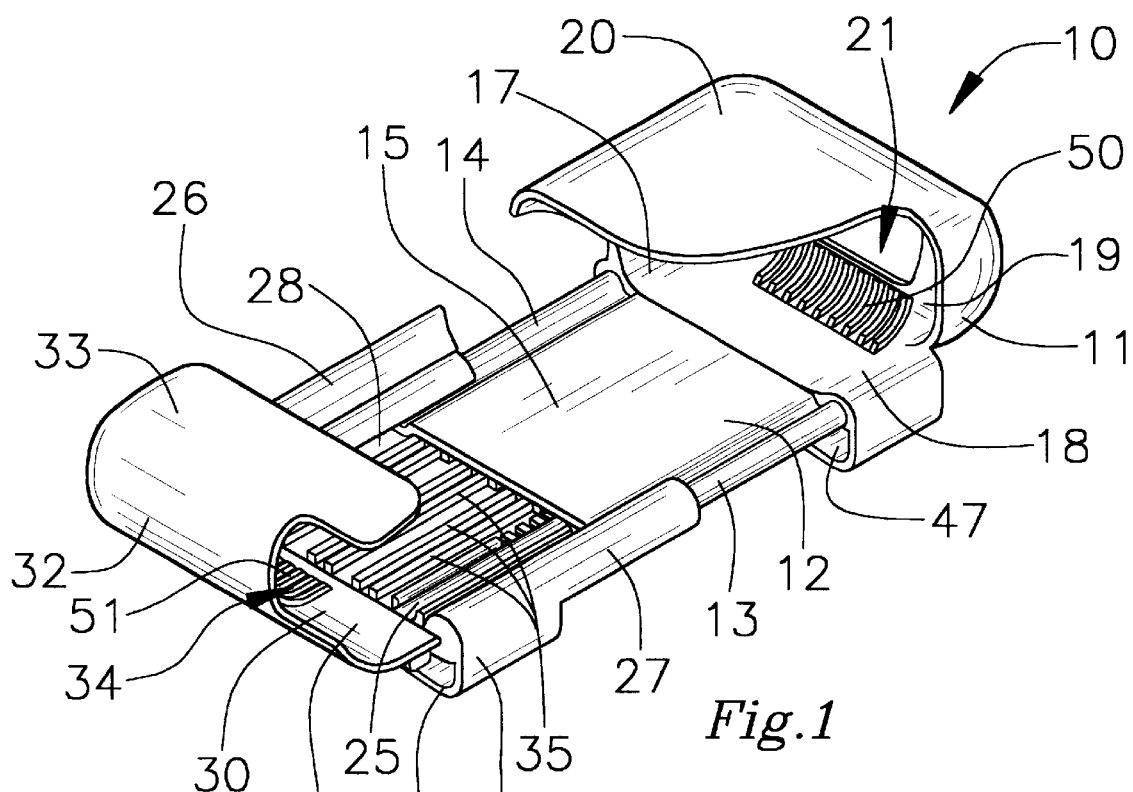
FIG. 1 is a perspective view of a new cellular telephone holder according to the present invention.
Figure 2:
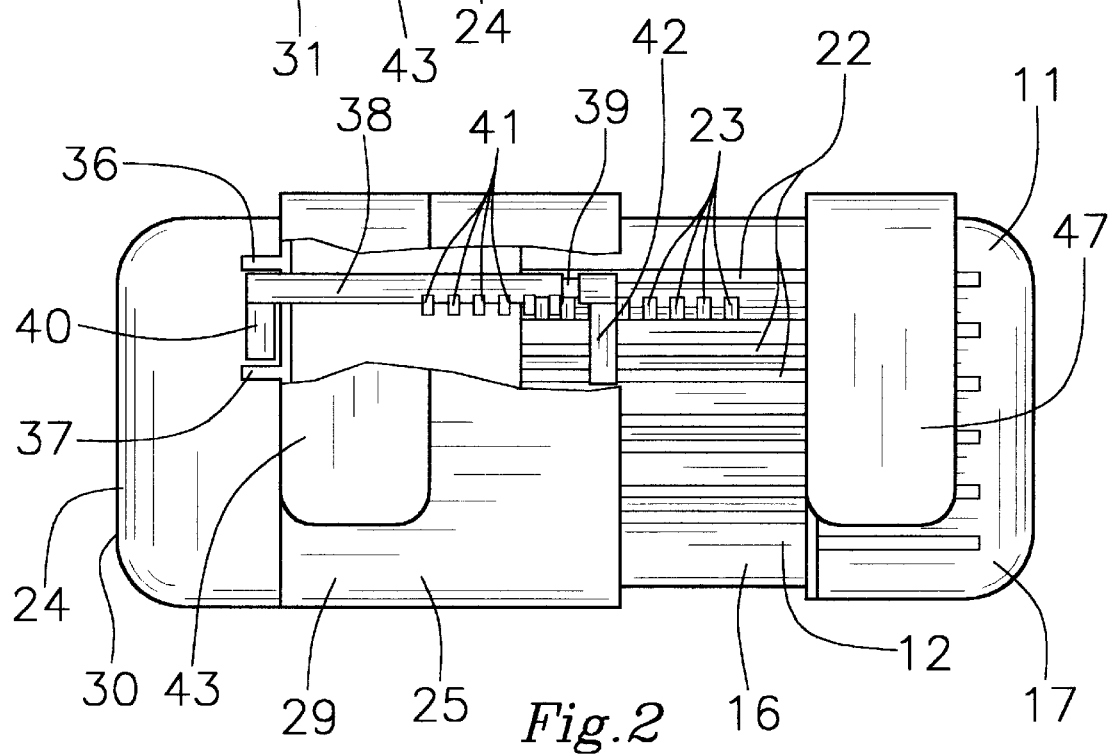
FIG. 2 is a back elevational view of the present invention.

With reference now to the drawings, and in particular to FIGS. 1 through 5 thereof, a new cellular telephone holder embodying the principles and concepts of the present invention and generally designated by the reference numeral 10 will be described.

As best illustrated in FIGS. 1 through 5, the cellular telephone holder 10 generally comprises a first clamp member 11 being adapted to support a bottom end of a cellular telephone. The first clamp member 11 includes a main wall 12 having longitudinal side edges 13,14, a front side 15 and a back side 16, and also includes an arcuate end wall 17 which is conventionally attached to an end of the main wall 12. The longitudinal side edges 13,14 of the first clamp member 11 is enlarged. The first clamp member 11 further has first rib-like track members 22 being conventionally disposed upon the back side 16 of the main wall 11 thereof. The arcuate end wall 17 of the first clamp member 11 also includes a first portion 18 which is conventionally attached to the main wall 12 of the first clamp member 11, and further includes a curved intermediate portion 19 which is integrally attached to the first portion 18, and also includes a second portion 20 which is integrally attached to the curved intermediate portion 19 and which is spaced from and disposed generally parallel to the first portion 18. The first clamp member 11 further includes an opening 21 being disposed through the curved intermediate portion 19 of the arcuate end wall 17. The first clamp member 11 also includes a plurality of teeth members 23 being arranged in row upon the back side 16 thereof.

A second clamp member 24 is adapted to support an upper end of the cellular telephone. The second clamp member 24 includes a main wall 25 having longitudinal side edges 26,27, a front side 28 and a back side 29, and also includes an arcuate end wall 30 which is conventionally attached at an end of the main wall 25. The arcuate end wall 30 of the second clamp member 24 also includes a first portion 31 which is integrally attached to the main wall 25 of the second clamp member 24, and further includes a curved intermediate portion 32 which is integrally attached to the first portion 31, and also includes a second portion 33 which is integrally attached to the curved intermediate portion 32 and which is spaced from and disposed generally parallel to said first portion 31. The longitudinal side edges 26,27 of the second clamp member 24 are looped and are adapted to receive the enlarged longitudinal side edges 13,14 of the first clamp member 11 therein. The second clamp member 24 further has second rib-like track members 35 being conventionally disposed upon the front side 28 of the main wall 24. The arcuate end wall 30 of the second clamp member 24 further includes a slot 34 being disposed through a longitudinal edge thereof and being adapted to receive an antenna of the cellular phone therethrough. The second clamp member 24 also includes catch members 36,37 being spaced apart and being conventionally disposed upon the back side 29 thereof.

A locking assembly for joining the first clamp member 11 to the second clamp member 24 includes a tubular member 38, and also includes a shaft 39 being extended into the tubular member 38, and further includes a plurality of lug members 41 being conventionally attached to an exterior of the tubular member 38 and being spaced along an end portion of the tubular member 38, and also includes a latch member 40 being conventionally attached to an end of the tubular member 38, and further includes a lever 42 being conventionally attached to an end of the shaft 39. The latch member 40 is removably disposed between the catch members 37,38, and the lug members 41 are engaged with the teeth members 23 of the first clamp member 11 for removably locking the first and second clamp members 11,24 together.

A fastener assembly for fastening the cellular telephone holder 10 to clothing of user includes clip members 43,47 with each being integrally attached to one of the longitudinal side edges of a respective first and second clamp members 11,24. Each of the clip members 43,47 has a main portion 44,52 and an arcuate end portion. The main portion 44,52 has a first end 45,48 which is spaced from the main wall 12,25 of a respective first and second clamp members 11,24. The main portion 44,52 also has a second end 46,49 which is in contactable relationship with the main wall 12,25 of a respective first and second clamp members 11,24.

Rubberized liner members 50,51 are securely and conventionally attached upon an interior of the arcuate end walls 17,30 of the first and second clamp members 11,24 to generally protect the cellular telephone.

In use, the user extends the first clamp member 11 about the bottom end of the cell phone and extends the second clamp member 24 about the upper end of the cell phone with the antenna extending through the slot 34 of the second clamp member 24 and with the first rib-like track members 22 receiving the second rib-like track members 35 therebetween, and the user secures the first and second clamp members 11,24 together by engaging the latch member 40 in between the catch members 37,38 and by engaging the lug members 41 between the teeth members 23. The user then clips the cellular telephone holder 10 upon one's clothing such as a belt.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A cellular telephone holder comprising:
   a first clamp member being adapted to support a bottom end of a cellular telephone;
   a second clamp member being adapted to support an upper end of the cellular telephone;
   a locking member for joining said first clamp member to said second clamp member;
   a fastener assembly for fastening said cellular telephone holder to clothing of user; and
   wherein said first clamp member includes a main wall having longitudinal side edges, a front side and a back side, and also includes an arcuate end wall which is attached to an end of said main wall.

2. A cellular telephone holder as described in claim 1, wherein said longitudinal side edges of said first clamp member are enlarged, said first clamp member further having first rib-like track members being disposed upon said back side of said main wall thereof.

3. A cellular telephone holder as described in claim 1, wherein said arcuate end wall of said first clamp member also includes a first portion which is attached to said main wall of said first clamp member, and further includes a curved intermediate portion which is attached to said first portion, and also includes a second portion which is attached to said curved intermediate portion and which is spaced from and disposed generally parallel to said first portion.

4. A cellular telephone holder as described in claim 1, wherein said first clamp member further includes an opening being disposed through said curved intermediate portion of said arcuate end wall.

5. A cellular telephone holder as described in claim 1, wherein said first clamp member also includes a plurality of teeth members being arranged in row upon said back side thereof.

6. A cellular telephone holder as described in claim 1, wherein said second clamp member includes a main wall having longitudinal side edges, a front side and a back side, and also includes an arcuate end wall which is attached at an end of said main wall.

7. A cellar telephone holder as described in claim 6, wherein said arcuate end wall of said second clamp member also includes a first portion which is attached to said main wall of said second clamp member, and further includes a curved intermediate portion which is attached to said first portion, and also includes a second portion which is attached to said curved intermediate portion and which is spaced from and disposed generally parallel to said first portion.

8. A cellular telephone holder as described in claim 6, wherein said longitudinal side edges of said second clamp member are looped and are adapted to received said enlarged longitudinal side edges of said first clamp member, said second clamp member further having second rib-like track members being disposed upon said front side of said main wall and being adapted to receive said first rib-like track members of said first clamp member therebetween.

9. A cellular telephone holder as described in claim 6, wherein said arcuate end wall of said second clamp member further includes a slot disposed through a longitudinal edge thereof and being adapted to receive an antenna of the cellular phone therethrough.

10. A cellular telephone holder as described in claim 6, wherein said second clamp member also includes catch members being spaced apart and being disposed upon said back side thereof.

11. A cellular telephone holder as described in claim 1, wherein said locking member includes a tubular member, and also includes a shaft being extended into said tubular member, and further includes a plurality of lug members being attached to an exterior of said tubular member and being spaced along an end portion of said tubular member, and also includes a latch member being attached to an end of said tubular member, and further includes a lever being attached to an end of said shaft, said latch member being removably disposed between said catch members and said lug members being engaged with said teeth members of said first clamp member for removably locking said first and second clamp members together.

12. A cellular telephone holder as described in claim 1, wherein said fastener assembly includes clip members each being integrally attached to one of said longitudinal side edges of a respective said first and second clamp members, each of said clip members having a main portion and an arcuate end portion, said main portion having a first end which is spaced from said main wall of a respective said first and second clamp members, said main portion also having a second end which is in contactable relationship with said main wall of a respective said first and second clamp members.

13. A cellular telephone holder as described in claim 1 further includes rubberized liner members being securely attached upon an interior of said arcuate end walls of said first and second clamp members to generally protect the cellular telephone.

14. A cellular telephone holder comprising:
   a first clamp member being adapted to support a back end of a cellular telephone, said first clamp member including a main wall having longitudinal side edges, a front side and a back side, and also including an arcuate end wall which is attached to an end of said main wall, said longitudinal side edges of said first clamp member being enlarged, said first clamp member further having first rib-like track members being disposed upon said back side of said main wall thereof, said arcuate end wall of said first clamp member also including a first portion which is attached to said main wall of said first clamp member, and further including a curved intermediate portion which is attached to said first portion, and also including a second portion which is attached to said curved intermediate portion and which is spaced from and disposed generally parallel to said first portion, said first clamp member further including an opening being disposed through said curved intermediate portion of said arcuate end wall, said first clamp member also including a plurality of teeth members being arranged in row upon said back side thereof;

a second clamp member being adapted to support, an upper end of the cellular telephone, said second clamp member including a main wall having longitudinal side edges, a front side and a back side, and also including an arcuate end wall which is attached at an end of said main wall, said arcuate end wall of said first clamp member also including a first portion which is attached to said main wall of said second clamp member, and further including a curved intermediate portion which is attached to said first portion, and also including a second portion which is attached to said curved intermediate portion and which is spaced from and disposed generally parallel to said first portion, said longitudinal side edges of said second clamp member being looped and being adapted to removably receive said enlarged longitudinal side edges of said first clamp member therein, said second clamp member further having second rib-like track members being disposed upon said front side of said main wall and being adapted to receive said first rib-like track members therebetween, said arcuate end wall of said second clamp member further including a slot disposed through a longitudinal edge thereof and being adapted to receive an antenna of the cellular phone therethrough, said second clamp member also including catch members being spaced apart and being disposed upon said back side thereof;

a locking member for joining said first clamp member to said second clamp member, said locking member including a tubular member, and also including a shaft being extended into said tubular member, and further including a plurality of lug members being attached to an exterior of said tubular member and being spaced along an end portion of said tubular member, and also including a latch member being attached to an end of said tubular member, and further including a lever being attached to an end of said shaft, said latch member being removably disposed between said catch members and said lug members being engaged with said teeth members of said first clamp member for removably locking said first and second clamp members together;

a fastener assembly for fastening said cellular telephone holder to clothing of user, said fastener assembly including clip members each being integrally attached to one of said longitudinal side edges of a respective said first and second clamp members, each of said clip members having a main portion and an arcuate end portion, said main portion having a first end which is spaced from said main wall of a respective said first and second clamp members, said main portion also having a second end which is in contactable relationship with said main wall of a respective said first and second clamp members; and rubberized liner members being securely attached upon an interior of said arcuate end walls of said first and second clamp members to generally protect the cellular telephone.

* * * * *